Aug. 22, 1961 J. I. FRANKE 2,997,634

MANUFACTURE OF FIELD-EFFECT TRANSISTORS

Filed Oct. 17, 1960

2,997,634

MANUFACTURE OF FIELD-EFFECT TRANSISTORS

Joachim Immanuel Franke, 56 Ave. du Parc Montsouris, Paris, France

Filed Oct. 17, 1960, Ser. No. 63,057
Claims priority, application France Nov. 7, 1959
2 Claims. (Cl. 317—235)

Figure 1:
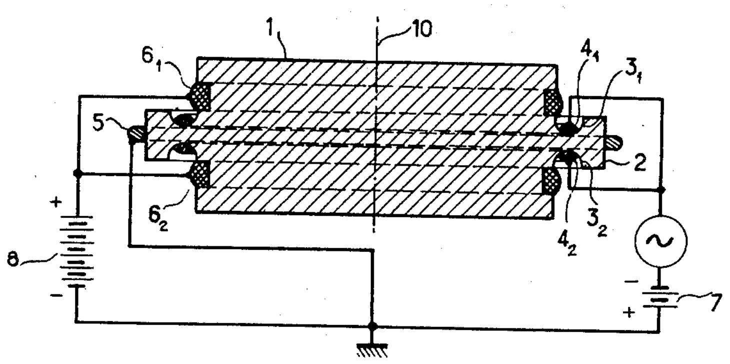

The invention concerns improvements in "unipolar" or "field-effect" transistors and, more particularly, the manufacture of unipolar transistors, the geometrical shapes of which render it possible to produce, between two space-charge regions, an annular conductive channel of very small cross-section and of very large expanse perpendicularly to the direction of propagation of the charge-carriers or, in other words, of very great width.

As is known, the theory of field-effect transistors has been set forth by W. Shockley who has shown, in particular, that the slope or "transconductance" of the characteristic current-voltage curve of a field-effect transistor formed in a semi-conductor of a given nature and doping depends upon the geometry of the conductive channel.

A particularly advantageous structure of a field-effect transistor as regards the geometry of the conductive channel is described in the published specification of German Patent No. 1,034,272 (August 17, 1955) of Edward George Roka, entitled "Unipolar Transistor Anordnung." This structure consists of a semi-conductive plate, on the faces of which are arranged electrodes which have a geometrical shape of revolution around the axis that is perpendicular to the faces of the said plate and passes through its center. One of the source and drain electrodes is annular, the other being circular; the gate electrode, interposed between the foregoing, is annular. The result of this is that the pinch-off is effected along a circular line.

It is known that the power which can be evolved by such field-effect transistors depends upon the cross-sectional area of the conductive channel. It is also known that the field effect is a phenomenon which occurs in the semi-conductive medium only at very small depths; one is therefore led to use, for producing field-effect transistors, semi-conductive plates, the lengths and the widths of which may be of the order of several millimeters, but the thicknesses of which are only a few tenths of a micron. The manufacture of such structures is therefore a very delicate process.

The object of the invention is to facilitate the manufacture of the said structure by giving them a geometrical shape which, while increasing their mechanical strength, renders possible an appreciable improvement of the slope of their current-voltage characteristic curves.

The structure of the invention can be produced by using the technological processes known at present for bipolar transistors of the standard type. It is obtained from a cylinder of semi-conductive material (germanium n, for example) with circular end faces, for example, and a height that is sufficient for rendering it possible to produce, at its middle, a peripheral projection of rectangular cross-section. Hollowed out in the sides of this projection respectively are circular cavities, the bases of which are filled with a metallic deposit, which forms a rectifying contact with the semi-conductor of the projection, and constitutes the gate electrodes. For a semi-conductive body of n-type germanium, these cavities may be hollowed out electrolytically and the metallic deposit, indium for example, may also be made electrolytically.

The annular conductive channel of the field-effect transistor is constituted by the space between the bases of the two cavities which are opposite each other. This space should be a few tenths of a micron. The width of the conductive channel may be as great as desired, since it depends only upon the circumference of the semi-conductive cylinder which serves as a support for the structure. On one side and the other of the projection hereinbefore considered, two rings of small depth of germanium N+ are formed in order to produce two drain electrodes which behave substantially like ohmic contacts. An annular source electrode of germanium N+ is formed on the peripheral part of the projection and may be connected to earth. The two rings of indium, which constitute the gate, are connected together electrically by an external metallic connection, in the same way as the rings of germanium N+ which form the drain. As is seen, the conductive channel, which is the delicate part of the field-effect transistor, is, in the case of the structure of the invention, firmly held from the mechanical point of view.

Figure 2:
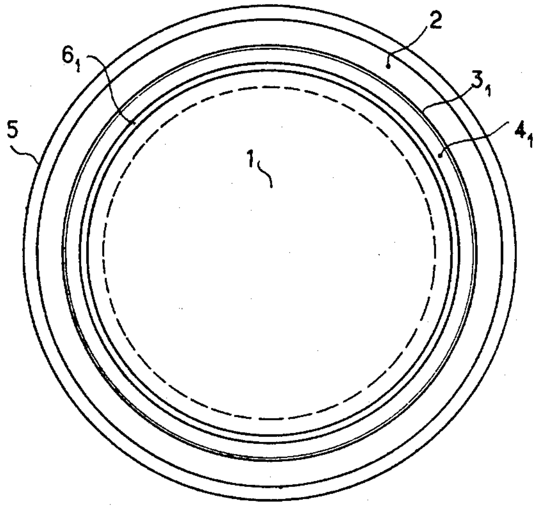

Other features of the invention will appear in the course of the following detailed description of a particular embodiment of the invention, which will be given with reference to the accompanying drawings, of which FIG. 1 is a section of a field-effect transistor according to the invention and FIG. 2 is an end view of the same transistor.

FIGS. 1 and 2 show a cylinder 1 of n-type germanium having an axis of revolution 10 and surrounded by a projection 2 cut in the mass by reduction of the diameter of the cylinder 1 in the neighbourhood of its ends. Hollowed out electrolytically in the sides of this projection 2 are cavities $3_1$ and $3_2$, on the bases of which are arranged rings $4_1$ and $4_2$ of indium having a rectifying contact with the germanium of the cylinder 1. The rings $4_1$ and $4_2$, which are connected together by an external connection, form the gate of the field-effect transistor, the said gate being polarized oppositely (i.e. negatively in relation to the source) by the generator 7 of direct current. The rings $6_1$ and $6_2$, which are located on one side and the other of the projection 2 in the cylinder 1, are highly doped to N+. Connected together externally by a connection, they constitute the drain electrode, polarized by the generator 8 of direct current. The ring 5 of germanium N+, which is formed on the periphery of the projection 2 is the source of the transistor connected to earth.

The operation of this transistor is absolutely similar to that given by Shockley in the well-known article entitled "A Unipolar Field-effect Transistor" which appeared in the review "Proceedings of the Institute of Radio Engineers," vol. 40, November 1952, pages 1365 to 1376.

The person skilled in the art will easily understand that, starting from the structure which has just been described, it is possible to conceive other structures which form part of the scope of the present invention. By way of example, the process of manufacture hereinbefore described renders it possible to produce transistors with two, three or more concentric annular gates; it also renders it possible to increase substantially the expanse of the electrodes by cutting, in a cylinder of semi-conductive material, a helical screw with a square thread. A helical gate is then constituted by two spirals of indium, which are accommodated in two cavities cut in the sides of the thread, and the source and drain electrodes, which are also helical, are constituted by a heavy doping to N+ of the peripheral surface of the thread and of the body of the screw between the sides of the thread.

I claim:

1. A unipolar field-effect transistor comprising within a single body of semiconductive material having the configuration of a cylinder with circular end faces and a peripheral projection of rectangular cross-section in the middle part of its height, a channel region having source and drain connections and a gate electrode forming a junction therewith, said gate electrode being constituted by two metallic rings deposited in circular cavities respectively hollowed out in the opposite sides of said projection.

2. A unipolar field-effect transistor comprising within a single body of semiconductive material of a given conductivity type having the configuration of a cylinder with circular end faces and a peripheral projection of rectangular cross-section in the middle part of its height, a channel region having source and drain connections and a gate electrode forming a junction therewith, said gate electrode being constituted by two metallic rings deposited in circular cavities respectively hollowed out in the opposite sides of said projection, said drain connection being connected to two rings heavily doped in said given conductivity type formed on the peripheral part of said cylinder on one side and the other of said projection, and said source connection being connected to a ring heavily doped in said given conductivity type formed on the peripheral part of said projection.

References Cited in the file of this patent

UNITED STATES PATENTS

| | | |
|---|---|---|
| 2,744,970 | Shockley | May 8, 1956 |
| 2,754,431 | Johnson | July 10, 1956 |